Dec. 10, 1935.  T. M. DE LA GARDE  2,023,411
MOTION PICTURE CAMERA
Filed Aug. 18, 1931   5 Sheets-Sheet 3
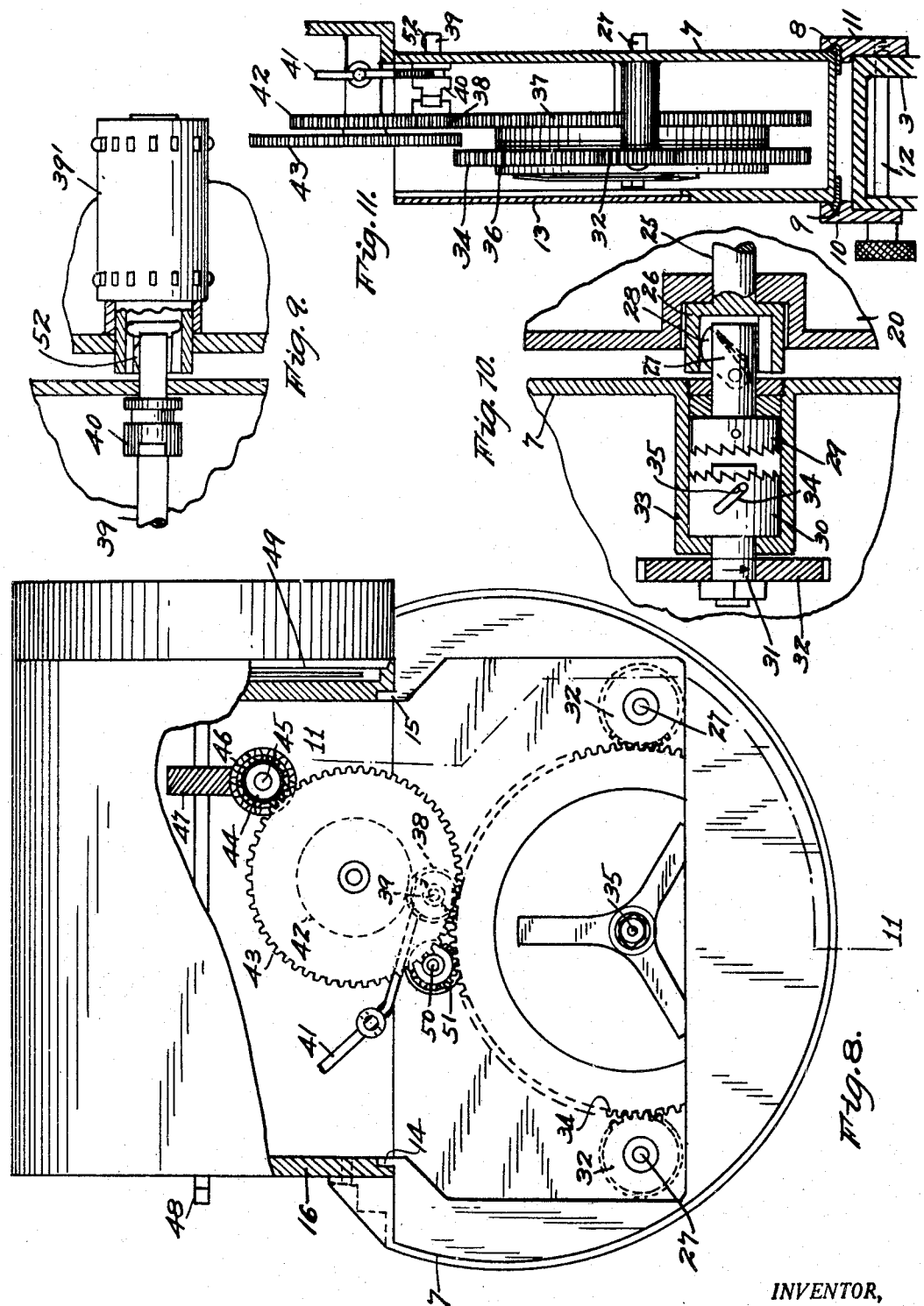
INVENTOR,
T. M. De La Garde,
BY F. E. Maynard,
ATTORNEY.

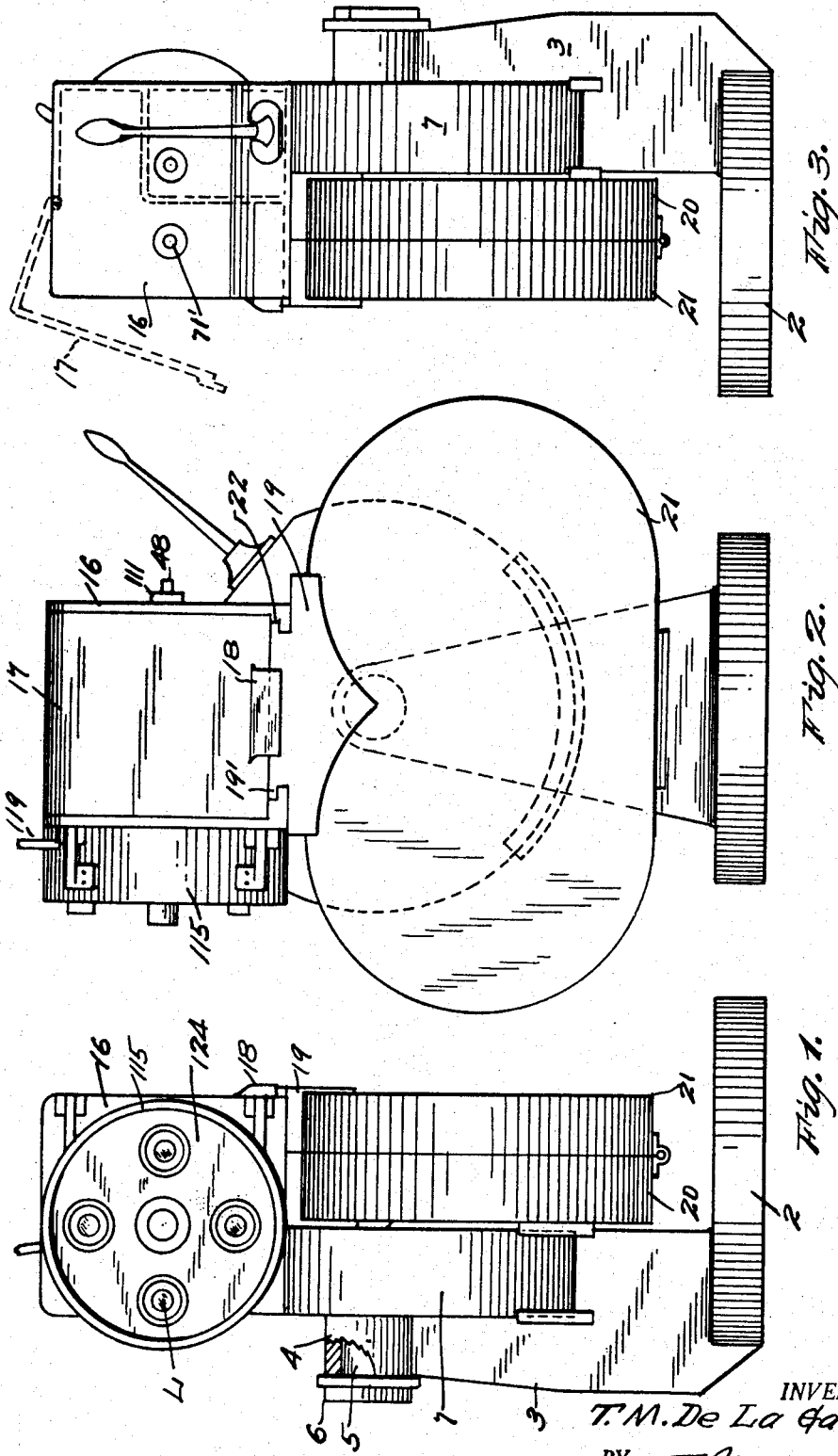

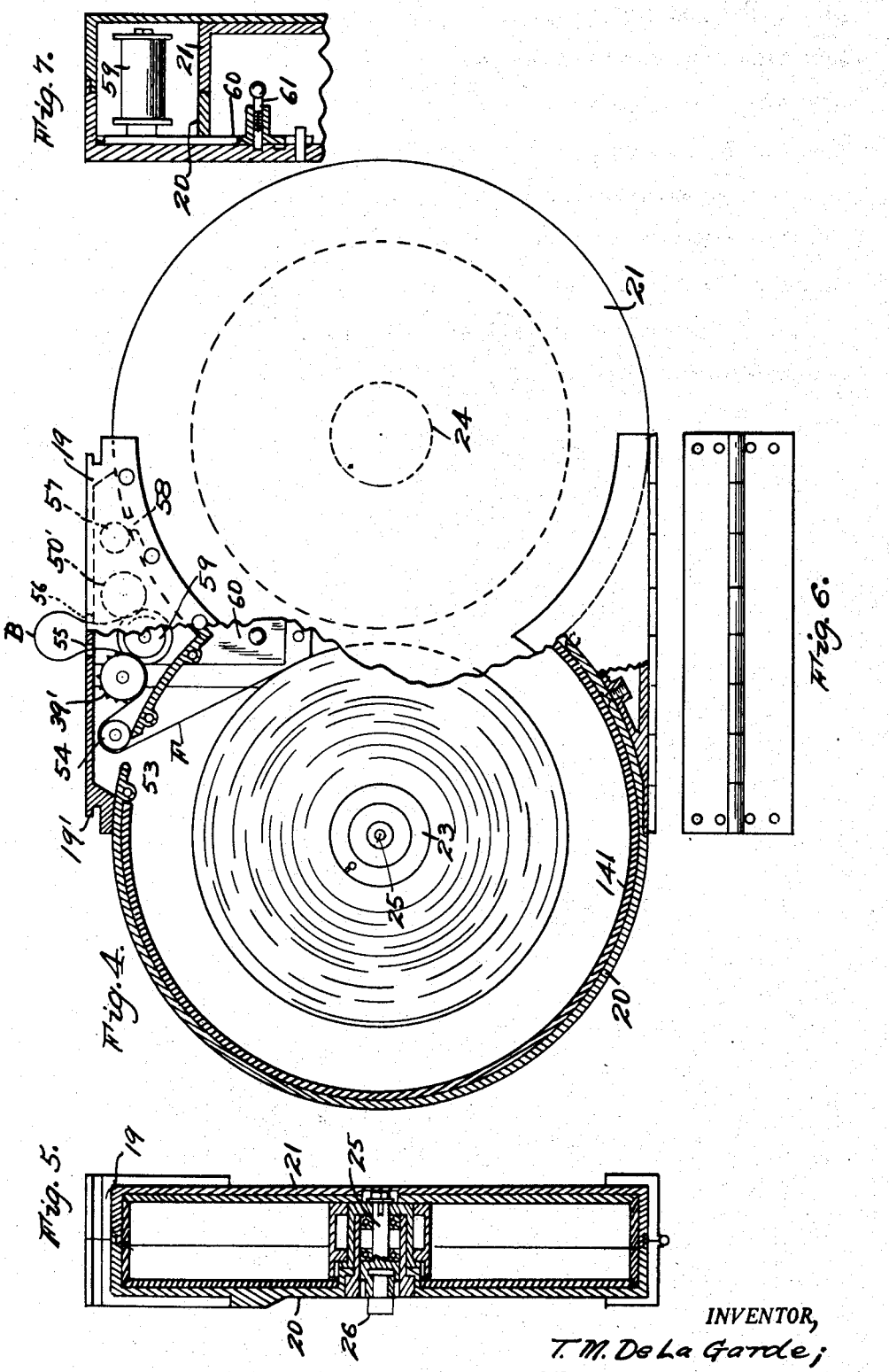

Dec. 10, 1935. T. M. DE LA GARDE 2,023,411
MOTION PICTURE CAMERA
Filed Aug. 18, 1931 5 Sheets-Sheet 4
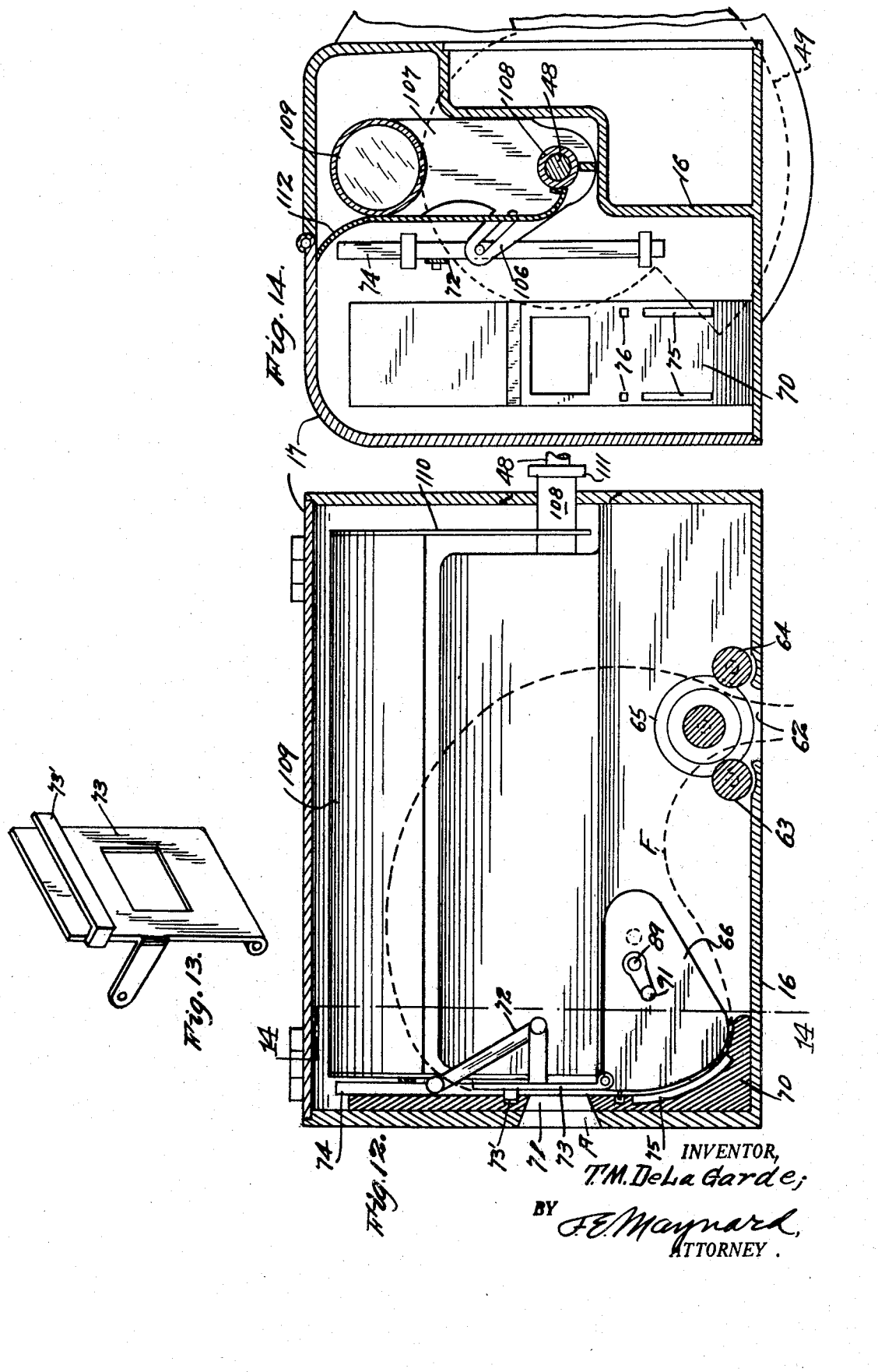
INVENTOR,
T. M. De La Garde;
BY F. E. Maynard,
ATTORNEY.

Dec. 10, 1935. T. M. DE LA GARDE 2,023,411
MOTION PICTURE CAMERA
Filed Aug. 18, 1931  5 Sheets-Sheet 5
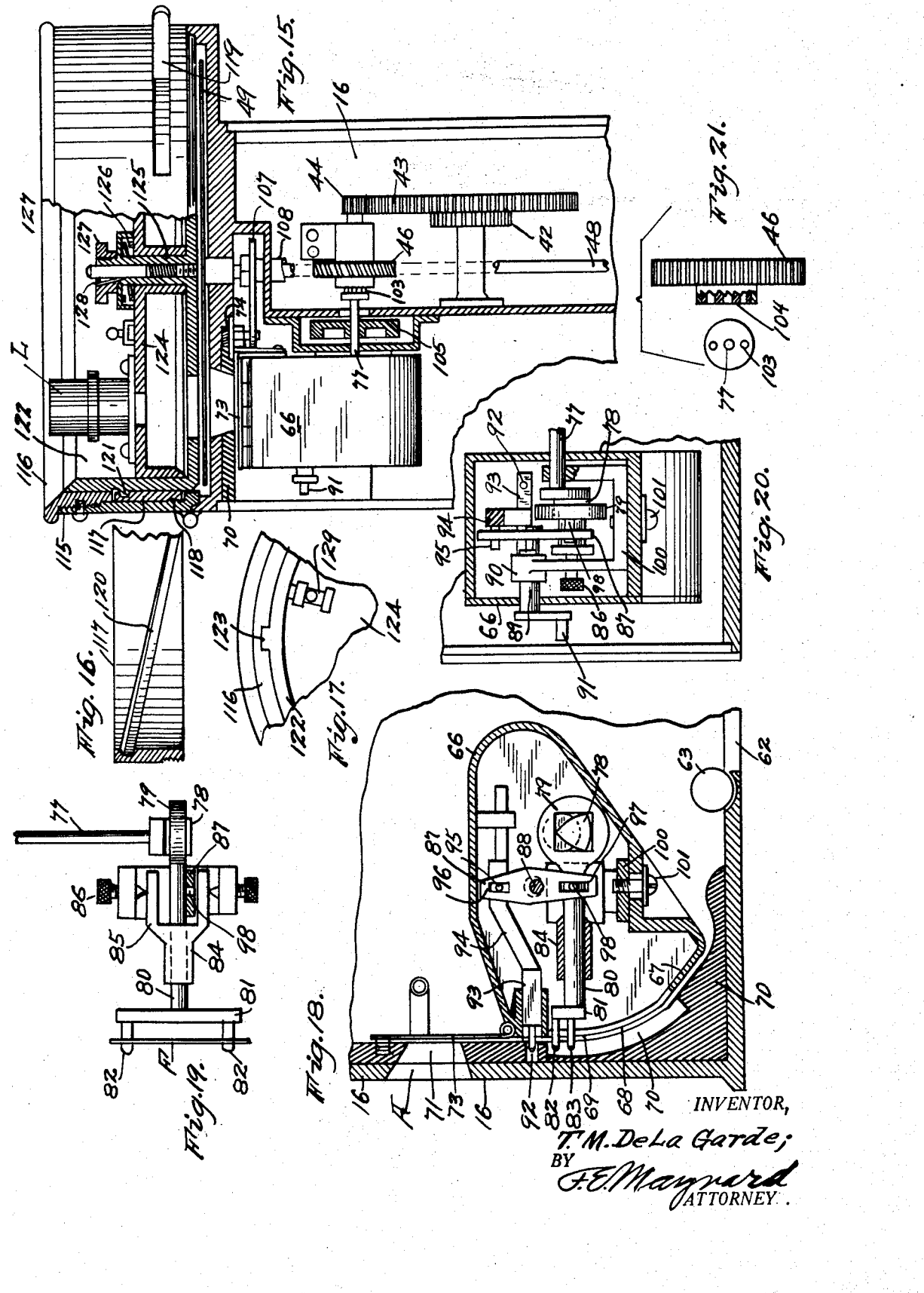

Patented Dec. 10, 1935

2,023,411

UNITED STATES PATENT OFFICE 2,023,411

MOTION PICTURE CAMERA

Theodor M. De La Garde, Los Angeles, Calif., assignor of three-fourths to Thomas L. Tally, Beverly Hills, Calif.

Application August 18, 1931, Serial No. 557,840

2 Claims. (Cl. 88—18.4)

This invention relates to cameras and especially to motion picture cameras of the type having a detachable magazine for a roll of film which is windable from one reel to another.

The invention has for its object the provision of a camera involving numerous material improvements giving the camera (which term we mean to include an entire unit with tripod features, mount and photographing apparatus, and actions) many valuable capacities and superior advantages in several particulars over previous motion picture cameras.

The invention consists in certain advancements in this art as set forth in the ensuing disclosure and having, with the above, additional objects and advantages, and whose constructions, combination and details of means, and the manner or operation will be made manifest in the description of the herewith illustrative embodiment; it being understood that modifications, variations and adaptations may be resorted to within the scope, principle and spirit of the invention as it is more directly claimed hereinafter.

Figure 1 is a front elevation of the camera. Figure 2 is a left-hand side elevation. Figure 3 is a rear view. Figure 4 is a sectional elevation of the cover side of the magazine. Figure 5 is a transverse vertical section of the magazine on a reel axis. Figure 6 is a bottom plan of the magazine back and cover hinge plate. Figure 7 is a sectional detail of a guide roller in the magazine dome. Figure 8 is a front elevation of the gear casing and mechanism therein, and a part of the camera housing and related parts. Figure 9 is a detail of clutch means between magazine sprocket and transmission parts. Figure 10 is a detail of clutch parts between transmission and a magazine reel spindle. Figure 11 is a transverse section on line 11—11 of Fig. 8.

Figure 12 is a vertical, longitudinal section of the camera head or box and shows film movement shell, and a focusing device in the box. Figure 13 is a perspective of the pull-down pressure gate. Figure 14 is a cross-section of the camera box on line 14—14 of Fig. 12.

Figure 15 is a horizontal, transverse section of a portion of the camera box, and shows the improved lens mount. Figure 16 is a detail section of a part of the mount device. Figure 17 is a front elevation of a fragment of the lens mount. Figure 18 is an elevation of the movement means for feeding the film past the aperture; parts being in section. Figure 19 is a plan of movement parts. Figure 20 is a cross-section of the movement. Figure 21 is a detail of drive clutch between the movement and the transmission gearing.

The apparatus includes a turntable 2 with a rigid pillar 3 standing on one side of its top and providing a journal 4 in which is turnable a substantial trunnion 5 having a nut-ring 6 on its outer end. The other end of the trunnion is fixed on the back of a circular housing part herein called the casing 7 which encloses transmission means later described. This casing has V-shaped segmental beads 8—9, Fig. 11, at its lower part, the bead 9 resting in a fixed way 10 and the bead 8 being engaged by a segment 11 clamped down by screw means 12 passing to the front of the pillar 3.

The trunnion 5 is on a cover plate 13, Fig. 11, of the gear casing 7 and this is secured at top flanges 14—15 to a box 16 forming the camera compartment of the housing one side of which is closed by a side door 17 having a bottom lip 18 to close over a dome 19 of a sectional magazine 20—21. The dome has side flanges 19′ adapted to slide into channels 22 provided therefor in the bottom of the box 16 where this overhangs the side of the gear case 7. Thus, the magazine can be easily attached or removed from the box while the cover 17 is open. When closed and locked, the cover firmly secures the attached magazine in place.

The magazine sections 20—21 are hinged on a longitudinal axis at the bottom and open from top to bottom on a medial plane longitudinally of the magazine. The section 20 constitutes the main or body piece and contains certain operative devices for a roll of film to be exposed in the camera. Referring to Fig. 4 it will be seen that the magazine is in the form of two segments which meet on a vertical chordal line so as to form a common film chamber with reels 23—24 on parallel centers which are spaced apart a distance a little more than the sum of the radii of two equal rolls of film F passing from reel to reel.

Hence, by this construction a magazine, with twinned compartments, of minimum over-all length is obtained.

The reels 23—24 have center spindles 25 with clutch drums 26 exposed at the back (20) of the magazine so as to instantly mesh with mutual drive studs 27, Fig. 10, which project from the near face of the gear casing 7. These studs have spring keys 28 to mesh in the drums 26 and form a part of an automatic action device whereby either reel 23—24 can be operated at will, without attention, as take-ups.

This action is secured by means of a ratchet face 29 on the inner end of the stud 27 which is automatically meshed by a complementary ratchet sleeve 30 slidably and turnably mounted on a shaft 31 on which is fixed a drive gear 32 (of which one is provided for each reel 23—24). The sleeve 30 has a slight oil-drag resistance in a hollow boss 33 and has turning and sliding action limited by co-action of its helical slot 34 and a pin 35 in the shaft 31.

When one shaft 31 is turning in one direction Fig. 10, the oil drag on the sleeve 30 will cause it to slide out of mesh with stud ratchet 29 and permit the spindle 25 to freely rotate in a reverse direction (and permit its reel film to pay off).

As soon as shaft 31, Fig. 10, is reversed the drag will cause the sleeve 30 to shift outward and close its ratchet face on the part 29, which then causes spindle 25 to become the winding side.

To effect operation of the set of reel-spindle, drive gears 32 these are in constant mesh with a large intermediate gear 34, Figs. 8 and 11, loose on a trunnion 35 and under control of a friction clutch disc 36 driven by a master gear 37. This friction transmission is to form a compensating reel action according to the gradual increment of winding reel roll of film; the master gear 37 having a constant rate, positive motion derived from an intermediate pinion 38 loose on a stud 39 having a splined clutch 40. This is under control of a shift lever 41 in the camera box 16 and is used to de-clutch the stud 39 to permit threading of a film over feed sprockets (later described) in the dome of the magazine.

The pinion 38 is driven by a gear 42, in the camera box, fixed to a larger timing gear 43 geared to a small pinion 44 on a cross-shaft 45. This shaft has a helical gear 46 meshing with an equal gear 47 fixed on a driven shaft 48 one end of which is adapted for motor or crank drive while the other (front) end has a shutter 49 running in front of the aperture wall of the camera box 16.

From the above it will be seen that the master gear can be rotated in either direction at will and that the clutches 29—30 controlling the take-up spindles 23—24 will act automatically to connect up the winding reel and disconnect the unwinding reel, depending only on direction of main shaft 48.

The gear 37 not only drives top stud gear 38, of stud 39, but also drives a parallel stud 50 by means of a gear 51.

The two spinning studs 39—50 project from the wall of the gear box and are provided with spring keys 52 to interlock with respective sprocket spools 39'—50' suitably mounted in the dome 19 of the attached magazine and as the magazine is placed in position the sprockets are concurrently coupled to their driving studs in the gear train.

Referring to Fig. 4, the threading of the magazine will be apparent. Film extends from reel 23 through a small port 53 to an idle roller 54, to and under sprocket 39' thence up through a small port 55 in the ceiling of the dome 19 to form a camera bight B. The bight returns through a small port 56, to and under sprocket 50', to idler 57, thence by port 58 to the reel 24. A light-stop and guide roller 59 lies between the sprockets 39'—50'. It will be seen that the dome structure and its system of guide rollers and film ports are so effective a seal for the rolls of film in the magazine that all forms of light traps and gates which are usually employed and bear frictionally on the film, are effectively eliminated.

The roller 59 is mounted on a slide 60 adapted to be moved toward and from the sprockets to facilitate threading the film through the dome. A detent 61 serves to lock the slide in adjusted positions.

The film loop or bight B is adapted to be pulled up and enlarged to a desired degree and be threaded in the necessary movement mechanism which intermittently steps the film to the lens aperture A of the camera box 16. The bottom of this box overhangs the dome of the magazine and has a bight-way 62 flanked by side rollers 63—64 and a flanged lead roller 65. The film F extends toward and under a movement shell 66 whose front face has a flat facet 67 merging with a curved guide face 68 merging to an upper flat facet 69; the surfaces being concentric with and spaced slightly from the near face of a film race block 70 set in the front bottom corner of the box 16 and having a window 71 at aperture A.

At the window 71 is hinged a pressure and guide gate 73 adapted to be swung down by action of a link 72 connected to an actuating bar 74 slidably mounted in the box and to one side of the film track.

The gate 73 has a finger 73' lying in front of the film and forms means whereby the film at the aperture can be bent down and back out of line of lens axis so that a view focus may be obtained by direct sighting through the box on the lens axis, as will be later explained.

Fig. 14 shows the block 70 as having a pair of parallel guide channels 75 and a pair of pin pockets 76 all to register with the usual sprocket holes at the sides of the film.

The feeding movement includes a main shaft 77, Fig. 20, having an eccentrically disposed crank-cam 78, of more or less equilateral triangle form, which operates in a quadrangular eye 79 of a shuttle rod 80 on whose opposite end is a cross-head 81 whose ends have vertically spaced, register or feed pins 82—83 to enter the film holes and advance or reverse the film step-by-step. The shuttle rod 80 is slidable in a sleeve bearing 84 with bifurcated arms 85 hung by coaxial bearing screws 86. The spaced arms 85 provide clearance for a vertical walking lever 87 pivoted on an eccentric 88 of a trunnion 89 in a bearing post 90. The trunnion 89 has a small handle 91 outside the shell 66, and inside the box 16, so that by turning the trunnion slightly it will throw the eccentric, carrying the lever 87, from the film race as needed to allow ready threading of the film past a pair of pilot pins 92 provided on a cross-head 93 and having a piston rod 94 reciprocative in suitable bearings in the shell.

The rod 94 has a pin 95 engaging in a slot 96 in the lever 87 which has in its part below the trunnion 88 a slot 97 receiving a pin 98 fixed on the shuttle rod 80.

The action of the cam 78 is to reciprocate the rod 80 to carry the register pins to and from the film, while this is caught and held by the pilot pins 92, and to give the rod variable speed up and down strokes; the pins 82—83 sweeping fast while engaged with the film, due to swing of the cam 78 in toward the axis of oscillation of the rocking, bearing sleeve 84. Conversely, as the cam swings away from the center (86) the rod sweep decelerates. A great advantage of this cycle is—that it makes it possible to use a shutter 49 with an opening of 240°.

The pilot pins 92 have periods of rest and hold the film F at all interims when the feed pins 82—83 are out of film engagement; the set of pins so coacting that the film is at all times under perfect control of movement.

To clear the film track, the operator has only to turn the shuttle cam to draw back the register pins 82—83, and then turns crank 91 to draw back the effective pilot pins by rocking the lever 87 on pin 98 as a fulcrum.

The post 90 is a part of a bearing chair 100 which is adjustably clamped by screw 101 so that the plane of trunnion 88 may be set to nicely locate the effective points of pins 92, 82—83.

The drive shaft 77, of the movement, has a pin clutch 103 noiselessly taking into a fiber head 104 fixed on the gear 46, Fig. 15. Also secured on the shaft 77 is a momentum wheel 105.

As above alluded to, means are incorporated whereby to permit of direct view focus through the camera box on the lens axis and for that reason the gate 73 is tiltable inward over the shell 66 of the film movement. This gate action is acquired by motion of the bar 74 which is actuated by a connected extension 106, Fig. 14, of a front arm 107 which is secured on a tubular shaft 108 surrounding the main shaft 48. The arm lies close to the front window 71 and is attached to a tube 109 extending parallel to the sleeve shaft 108, at the rear end of which is an arm 110 supporting the relative end of the sight tube 109. The sleeve shaft has an exterior knob 111 by which the operator may instantly rock the sleeve shaft 108 and bring the sight tube 109 down to window 71, and in line with a peep-hole 71' in the back wall of the box 16.

Since a loop of the film is normally playing in the camera box and exposed above the movement shell 66 means are provided to shift this loop out of the sighting position of the tube. As shown this means includes the finger 73' and a device carried by the tube, and consists of a flexible sheet 112 which acts as a light blind as well as a push down device depressing and covering the film loop while the tube 109 is in sighting position on the lens axis. As the tube is returned to ineffective position the resilient film loop will spring back to free position.

A feature, also, greatly aiding in focusing the camera consists of a lens mount capable of carrying a plurality of lenses and providing for instant selection of one or another and for quick focusing.

This mount comprises an annular casement 115 hinged at one side to the front wall of the camera box and having a threaded bezel 116. A turnable barrel 117 engaging fine threads 118 in the casement has a handle 119 extended therethrough to provide for manual operation. The barrel has a system of internal thread grooves 120 engaged by respective thread beads 121 on cup 122 slidably fitting the barrel and also the bezel bore. Splines 123 interrelate the bezel and the cup so that the latter has only an axial adjustment as the screw barrel 117 is turned.

Turnably fitted in the cup is a multiple lens turret 124 on a center hub 125 of the cup and under pressure of a friction brake 126 including a button 127 engaged by a spring-key plunger 128 latching the turret in rotated adjustment to hold a selected lens L in register with the camera aperture. It is only necessary to press in the key plunger to permit rotation of the turret to change lens. A simple bolt 122 may be used to lock the turret to the barrel 117 after lens register. A set of turrets being provided with various lenses on each, quick change of turret may be made by running off the screw button 127 and substituting one turret for another.

It will be seen that by provision of the swinging casement for the lens system several advantages are attained, such as—easy access to rear of cells of lenses for cleaning, and for ready introduction of filters or other devices at the aperture or back of lenses.

Owing to the current use of highly sensitive photographic film loading and unloading of magazines is done in total darkness and the threading of the film must be done by sense of touch. In old forms of magazines the film has to be carefully and tediously threaded through the chamber in a slow and unhandy manner. On the contrary, by the magazine of this disclosure it is very simple to place a reel of film in position and thread up the parts because of the great degree of accessibility afforded by total removal of the full cover side, or half, of the casing.

What is claimed is:

1. In a motion picture film movement, a pilot pin element, a feeding claw member and an actuator therefor, a lever operatively connecting said element and said member for synchronous reciprocation, and a sleeve slidably bearing said member and having a forked, pivoted end between whose arms said lever is pivotally attached to said member for free reciprocation therewith as to the sleeve.

2. A device of the structure set forth in claim 1, and in which the actuator is disposed on the side of the fulcrum of the sleeve diametrically opposite the sleeve part.

THEODOR M. DE LA GARDE.